US010656610B2

(12) United States Patent
Miles (10) Patent No.: US 10,656,610 B2
(45) Date of Patent: May 19, 2020

(54) WEB-BASED CONTROLLER FOR ELECTRONICS

(71) Applicant: Edward W. Miles, Saint Joseph, MO (US)

(72) Inventor: Edward W. Miles, Saint Joseph, MO (US)

( * ) Notice: Subject to any disclaimer, the term of this patent is extended or adjusted under 35 U.S.C. 154(b) by 33 days.

(21) Appl. No.: 15/878,507

(22) Filed: Jan. 24, 2018

(65) Prior Publication Data

US 2019/0227507 A1 Jul. 25, 2019

(51) Int. Cl.
*G05B 19/042* (2006.01)
*H05B 47/18* (2020.01)

(52) U.S. Cl.
CPC ........... *G05B 19/042* (2013.01); *H05B 47/18* (2020.01); *G05B 2219/2664* (2013.01)

(58) Field of Classification Search
CPC .......... G05B 19/042; G05B 2219/2664; H05B 37/0254
See application file for complete search history.

(56) References Cited

U.S. PATENT DOCUMENTS

| | | | | |
|---|---|---|---|---|
| 10,102,844 B1* | 10/2018 | Mois | ................. | G06F 16/3329 |
| 2003/0105854 A1* | 6/2003 | Thorsteinsson | ......... | G06F 9/542 |
| | | | | 709/223 |
| 2003/0151909 A1* | 8/2003 | Sid | ..................... | H05B 37/0272 |
| | | | | 362/85 |
| 2010/0115126 A1* | 5/2010 | Kanakadandi | ........ | G06F 16/219 |
| | | | | 709/237 |
| 2010/0214948 A1* | 8/2010 | Knibbe | ............... | H04L 12/2803 |
| | | | | 370/254 |
| 2011/0260652 A1* | 10/2011 | Hsieh | ................. | H05B 37/0272 |
| | | | | 315/312 |
| 2014/0265935 A1* | 9/2014 | Sadwick | ............ | H05B 33/0815 |
| | | | | 315/307 |
| 2016/0073470 A1* | 3/2016 | Casper | ................ | G09G 3/3413 |
| | | | | 315/153 |

* cited by examiner

*Primary Examiner* — Thomas C Lee
*Assistant Examiner* — Michael Tang
(74) *Attorney, Agent, or Firm* — Husch Blackwell LLP (57) ABSTRACT

A system for controlling a remote electronics system includes a configuration device, a venue device, a user device, and a storage device storing configuration information relating to each piece of equipment included in a list of equipment. The configuration device performs a series of steps, including: accepting from the venue device, at least one piece of venue equipment from the list of equipment; accessing the configuration information relating to the at least one piece of venue equipment; accepting from the user device at least one generalized instruction (agnostic as to which equipment was selected) for a piece of equipment; creating at least one instruction specific from the at least one generalized instruction based on the configuration information; and transmitting the at least one specific instruction to the venue device. The venue device then uses same to control the at least one piece of venue equipment.

7 Claims, 5 Drawing Sheets

WEB-BASED CONTROLLER FOR ELECTRONICS

FIELD

The present disclosure relates generally to the technical field of web-based controllers for electronics. In a specific example, the present disclosure may relate to an online system for venue-specific stage electronics via generalized DMX communication.

BACKGROUND

DMX communication is the protocol used most frequently for stage lighting control systems. A DMX controller utilizes various channels of data, each channel typically having a value from 0 to 255. A lighting device receives all such channels, but is programmed to only pay attention to a certain number of channels, beginning at a specified channel.

Unfortunately, there are no channel standards among manufacturers of stage lighting and effect devices. Among various brands of a single device, the channels that control certain parameters—or even how each parameter is controlled—is not uniform. For example, one device might have three different color channels (usually red, green, and blue) through which the user can create any color. However, another device might have one channel for color control, and a value of 0 to 10 sets the color to white, 11-20 set it to red, 21-30 to green, etc.

Thus, the arrangement of data within a channel, and even the feature controlled by each channel is determined by the exact device models used, as well as the starting channels to which each device is set. The data stream generated by a controller is specific to a given venue's system, which comprises specific models of devices used in that venue's lighting and effects rig. A single data stream would do something drastically different if used on a different system.

Presets and automations are collections of presets that are synchronized to a timeline. Such presents and automations are therefore only useful to someone who owns or otherwise has regular use of a given venue's system. It is only when the presets and/or automations were created for a given system that they are useful. Most bands and musicians would like to have control over their own stage lighting and effects. However, without the money to purchase and haul their own lighting/effects system, many bands are left without viable options. Many bands and musicians therefore simply opt out of controlling their own lighting and other effects. Trying to program each venue's system before a show would take hours of setup time prior to each performance.

As bands and musicians are generally the creative forces behind their musical performances, these performances would be greatly enhanced if the bands and musicians could have control over their own lighting.

DETAILED DESCRIPTION

Example methods and systems for data processing are described. In the following description, for purposes of explanation, numerous specific details are set forth in order to provide a thorough understanding of example embodiments. It will be evident, however, to one of ordinary skill in the art that embodiments of the present disclosure may be practiced without these specific details.

Figure 1:
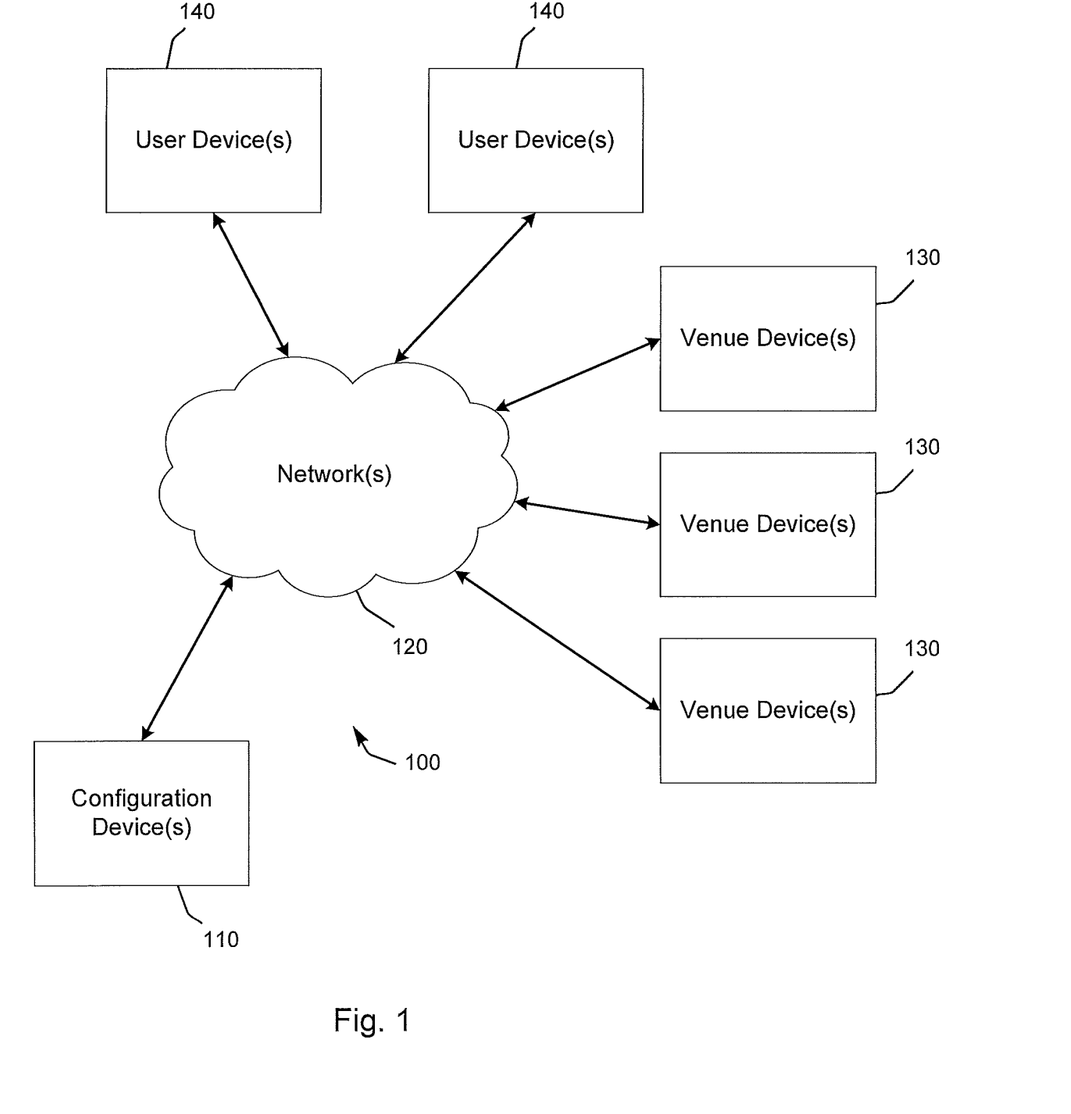
FIG. 1 is a block diagram of an example system, according to an example embodiment.

FIG. 1 is a block diagram of an example system 100, according to an example embodiment. The system 100 includes a configuration device 110 in communication with one or more networks 120 (which will be referred to herein as network 120). The configuration device 110 may be an internet server or the like. One or more venue devices 130 may communicate with the configuration device 110 via the networks 120. Similarly, one or more user devices 140 may communicate with the configuration device 110 via the networks 120.

The network 120 by which the venue devices 130 and user devices 140 communicate with the configuration device 110 may include, by way of example, Mobile Communications (GSM) network, a code division multiple access (CDMA) network, 3rd Generation Partnership Project (3GPP), an Internet Protocol (IP) network, a Wireless Application Protocol (WAP) network, a Wi-Fi network, or an IEEE 802.11 standards network, as well as various combinations thereof. Network 120 may also include optical communications. Network 120 may also include wired communication. Other conventional and/or later developed wired and wireless networks may also be used.

A venue device 130 may be used by personnel at a venue. A venue device 130 may be a stand-alone device that solely provides at least some of the functionality to enable communication with the configuration device 110, or may be a multi-use device that has functionality outside of same. Examples of a venue device 130 include a set-top box (STB), a receiver card, a mobile telephone, a personal digital assistant (PDA), a display device, a portable gaming unit, and a computing system; however, other devices may also be used. For example, a venue device 130 may include a mobile electronic device, such an IPHONE or IPAD device by Apple, Inc., mobile electronic devices powered by ANDROID by Google, Inc., and a BLACKBERRY device by Research In Motion Limited. A venue device 130 also include other computing devices, such as desktop computing devices, notebook computing devices, netbook computing devices, gaming devices, and the like. Other types of electronic devices may also be used.

A user device 140 may be used by a musician or band member or the like. A user device 140 may be a stand-alone device that solely provides at least some of the functionality to enable communication with the configuration device 110, or may be a multi-use device that has functionality outside of same. Examples of a user device 140 include a set-top box (STB), a receiver card, a mobile telephone, a personal digital assistant (PDA), a display device, a portable gaming unit, and a computing system; however, other devices may also be used. For example, a user device 140 may include a mobile electronic device, such an IPHONE or IPAD device by Apple, Inc., mobile electronic devices powered by ANDROID by Google, Inc., and a BLACKBERRY device by Research In Motion Limited. A user device 140 also include other computing devices, such as desktop computing devices, notebook computing devices, netbook computing devices, gaming devices, and the like. Other types of electronic devices may also be used.

In some embodiments, an application may be downloaded, installed, and launched on a venue device 130 and/or on a user device 140 to enable the device operator to facilitate interaction with the configuration device 110. The application may take advantage of hardware and/or software functionality provided by manufacturers of the devices. For example, the application may use the SAFARI web browser on the IPHONE device, the Webkit browser on an ANDROID device, MOBILE INTERNET EXPLORER on a WINDOWS MOBILE device, or on any of the aforementioned devices. The application may include instructions that when executed on a venue device 130 or a user device 140, cause a machine to change its state or perform tasks within the machine and with other machines. In some embodiments, the application made available for download to a venue device 130 may not be identical to the application made available for download to a user device 140, based on the different functionalities discussed below.

The application may be downloaded via an entity that makes available applications created by the application provider and/or third parties for download and use on electronic devices. Examples of companies that make available applications may include Apple, Inc. through its operation of ITUNES STORE, Google, Inc. through its operation of ANDROID MARKET, AT&T through its operation of its APPCENTER, and Research In Motion Limited through its operation of BLACKBERRY APP WORLD. Each of these device companies can host and supply proprietary apps, open apps, and apps by third parties. In some embodiments, the application may be downloaded from application download sites, the configuration device 110 itself, and/or a web-based application distribution system that may be accessed, e.g., via a web browser executed on an electronic device.

The venue devices 130 and user devices 140 may be in a client-server relationship with the configuration device 110, a peer-to-peer relationship, or in a different type of relationship with the configuration device 110. The configuration device 110 may be in communication directly (e.g., through local storage) and/or through the network 120 (e.g., in a cloud configuration or software as a service) with a database.

While the system 100 in FIG. 1 is shown to include single devices 110, 130, 140, multiple devices may be used. The devices 110, 130, 140 may be the same type of device or may be different device types. When multiple devices are present, the multiple devices may be of the same device type or may be a different device type. Moreover, system 100 shows a single network 120; however, multiple networks can be used. The multiple networks may communicate in series with each other to link the devices 110, 130, 140 or in parallel to link such devices.

Figure 2:
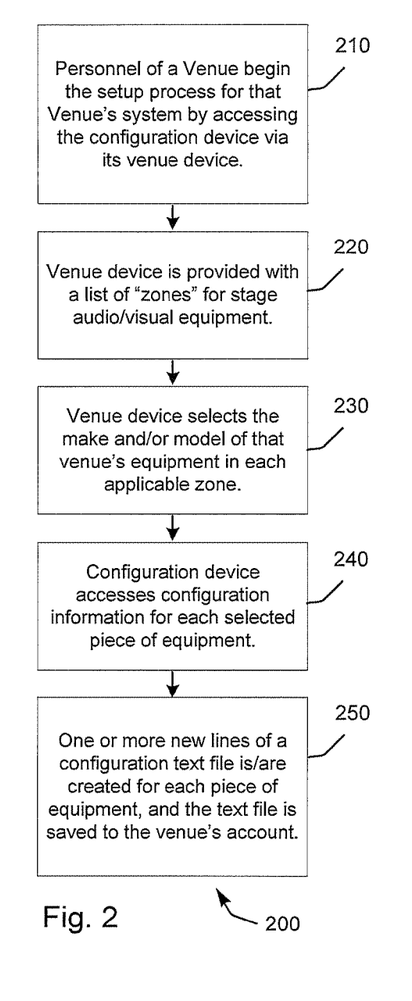
FIG. 2 is a flow diagram of a set-up process for a venue within an example configuration device, according to an example embodiment.
Figure 6:
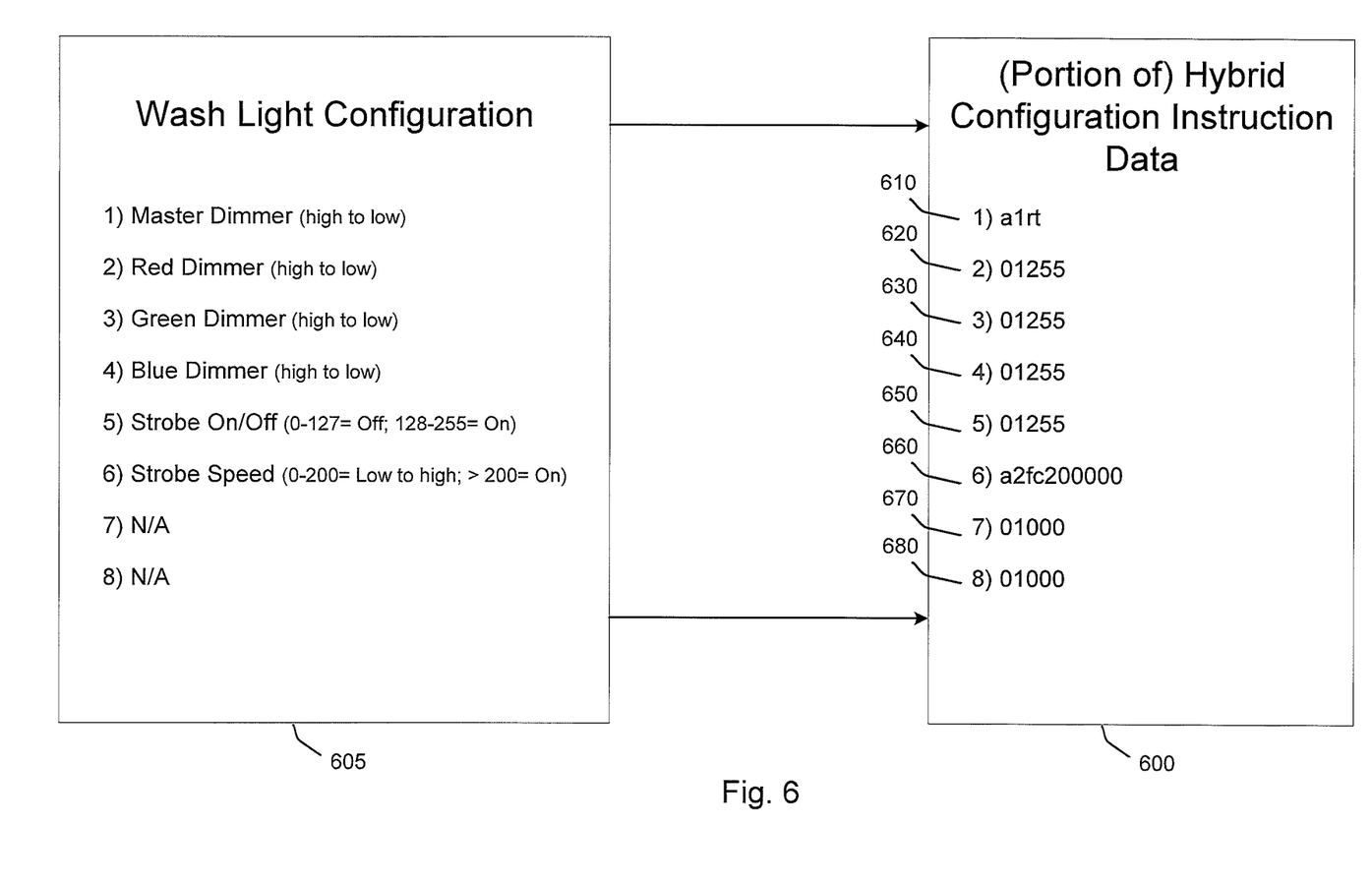
FIG. 6 is a diagram illustrating a portion of a configuration file for a venue, according to an example embodiment.

FIG. 2 illustrates a flow diagram of a set-up process 200 for a venue within an example configuration device, according to an example embodiment. At step 210, a venue device 130 accesses the configuration device 110 via the network 120, to begin the process for the stage system at that venue. This may occur via a web-based portal, or a downloadable app, or the like, as discussed above. At step 220, the venue is provided with a list of standard "zones" of a stage. For example, a zone may be "front left" or the like. At step 230, the venue selects the make and model of one or more devices in a specific zone. This may occur via a drop-down list, or the like. Other information may also be provided, including but not limited to any specific channels used by the equipment. Once the venue selects a piece of equipment for a zone, at step 240 the configuration device 110 accesses configuration information for the selected piece of equipment. For example, the list 605 shown in FIG. 6 illustrates an example set of device channels for a given wash light, which in an example system may be in a central zone. Such configuration information may be known by the configuration device 110, and may reside in a database associated with the configuration device 110, as discussed above. At step 250, one or more new lines of a configuration text file are created for each piece of equipment input by the venue 130, and the configuration text file is associated with the venue 130 in a database.

Figure 3:
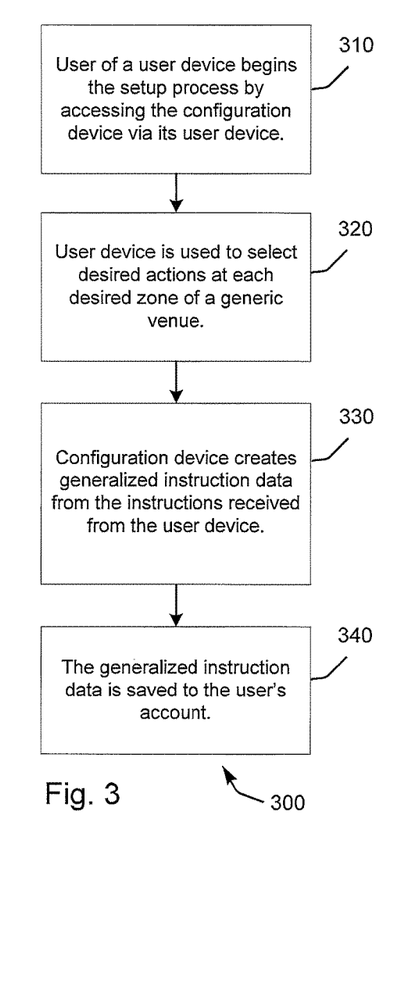
FIG. 3 is a flow diagram of a set-up process for a user within an example configuration device, according to an example embodiment.

FIG. 3 illustrates a flow diagram of a set-up process 300 for a user, such as a musician or a band, within an example configuration device 110 according to an example embodiment. At step 310, a user device 140 accesses the configuration device 110 via the network 120, to begin the process for creating a generalized instruction or set of instructions for stage equipment. At step 320, the user inputs its desired actions for each desired zone. As a non-limiting example that will be discussed further below, the user may choose a strobe light in the center zone. The user may choose to have the strobe intensity set at about ⅘ths of max, and the strobe speed set to maximum. At step 330, the configuration device 110 creates generalized instruction data from the user's instructions from step 320. The generalized instruction data may be agnostic to the type of equipment in any particular venue. In the example discussed above, the ⅘ths of max intensity is converted to a value of 200 (out of 255). Similarly, the max strobe speed is converted to 255 (out of 255). Such generalized instructions may be saved into one or more text strings. In the example above, the generalized instructions for the center zone light are saved as a single string of 200255. At step 340, the user's configuration, in the form of generalized instructions, is saved in the database and is associated with the user.

Figure 4:
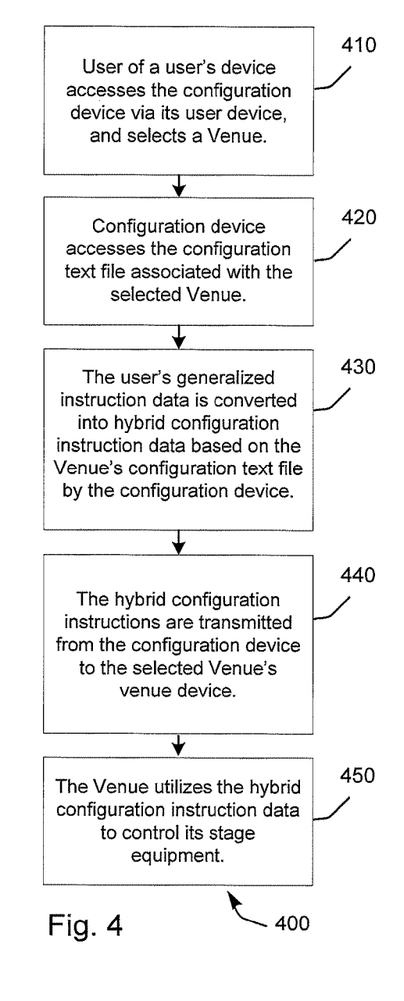
FIG. 4 is a flow diagram of a process controlling a venue's equipment based on a user's generalized instructions, according to an example embodiment.

FIG. 4 is a flow diagram of a process 400 controlling a venue's equipment based on a user's generalized instructions, according to an example embodiment. At step 410, a user selects a venue. At step 420, the configuration device 110 accesses a configuration file associated with the selected venue. At step 430, the user's generalized instructions are translated into hybrid configuration instructions specific to the selected venue's devices, based on the venue's configuration text file. At step 440, the hybrid configuration instructions are transmitted to the venue device 130 for use in the venue's system. At step 450, the venue utilizes the translated venue-specific instructions to control the venue's stage equipment. It will be understood that the sequence in this figure and in subsequent figures may occur in real time when the instructions are used by the venue, rather than in advance. Thus, the user could input the instructions manually (e.g., by changing digital faders and switches) on the fly, or could call up a preset that is stored as per FIG. 4.

Figure 5:
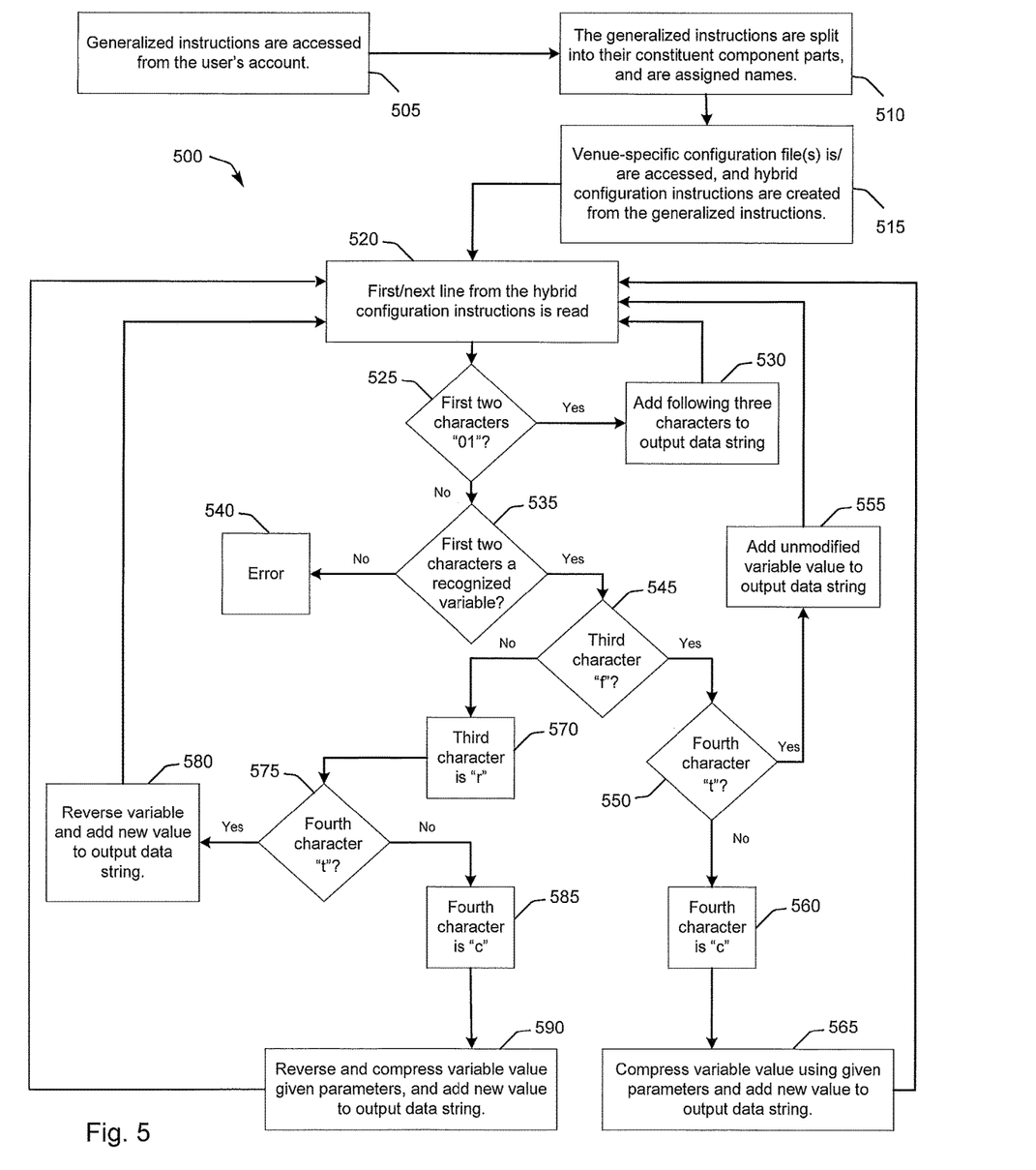
FIG. 5 is a flow diagram of a process for translating a user's generalized instructions into instructions specific to a selected venue, according to an example embodiment.

FIG. 5 illustrates a flow diagram of a process 500 for translating a user's generalized instructions into instructions specific to a selected venue, according to an example embodiment. FIG. 5 will be discussed in the context of FIG. 6, which gives an example of a hybrid configuration instruction file 600 for an example piece of equipment (here, a known wash light) specific to a venue. It will be understood that the hybrid configuration instruction file 600 need not actually be stored as a file, but could merely be an in-process stage of translating the user's generalized instructions into instructions specific to the selected venue. FIG. 6 is therefore merely for illustrative purposes only, to help with a visual understanding of how the instructions are broken down and modified for the selected venue.

At step 505, generalized instructions from the user's input are accessed from the user's account. As noted above, the example generalized instructions come in the form of the number 200255. At step 510, the number 200255 is split into its constituent components, which are assigned names—200 (denoted "a1") and 255 (denoted "a2"). At step 515, the configuration device 110 accesses the venue-specific configuration information (e.g., list 605) from the selected venue's account. The configuration device 110 then creates a set of hybrid configuration instructions 600 from the combination of generalized user instructions and the venue-specific configuration information.

In this example embodiment, the user elected a strobe intensity and a strobe speed. The configuration device 110 determines that intensity corresponds to the first channel 610 of the venue's center light, and that strobe speed corresponds to the sixth channel 660 of the venue's center light. Therefore, the value a1 is added to the hybrid configuration instructions 600 in its channel one position 610, and the value a2 is added to the channel six position 660.

In addition, the configuration device 110 determines from the venue-specific configuration information that the "master dimmer" channel (first channel 610) for the venue's center light is a "high to low" channel, meaning that a desired value for "off" is actually represented by a "255," and a desired value of "fully on" is represented by a "0." It thus denotes in the hybrid configuration instructions 600 for the first channel 610 that the value is subject to reversal. In the embodiment shown, this is noted by the addition of an "r" (for "reverse") after "a1" in the instructions 600 for the first channel 610. The sixth channel 660, however, is a standard "low to high" channel, so an "f" (for "forward") is added after "a2" in the instructions 600 for the sixth channel 660.

Similarly, the configuration device 110 determines from the venue-specific configuration information that the "strobe speed" channel (the sixth channel 660) for the venue's center light is a compressed channel. In this example, values from 0 to 200 range from low to high, but any value above 200 sets the light to a constant-on condition. The configuration device 110 thus denotes in the hybrid configuration instructions 600 for the sixth channel 660 that the value is subject to compression. In the embodiment shown, this is noted by the addition of a "c" (for "compressed") after "a2f" in the instructions 600 for the sixth channel 660. The first channel 610, however, is a standard uncompressed channel, so an "t" is added after "a1r" in the instructions 600 for the first channel 610. The instructions 600 for the sixth channel 660 also include the numbers 200000 after "a2fc" to denote the compression range of 200 starting at 000 (i.e., from 0-200).

The remaining channels of the hybrid configuration instructions 600 are set to 01255 (for the second, third, fourth, and fifth channels 620, 630, 640, 650, which could accept inputs for this venue's center light) and 01000 (for the seventh and eighth channels 670, 680, which are not applicable to this venue's center light). Values of "255" are appropriate for the second, third, and fourth channels 620, 630, 640 because the master dimmer has already been set to its maximum, so these color-specific dimmers are set accordingly. A value of "255" is also appropriate for the fifth channel 650, because this value (or any value above 127) causes the strobe function of this example wash light to function. Values of "000" are appropriate for the seventh and eighth channels 670, 680 because these channels are not used with this example wash light. The leading "01" values will be explained in detail below.

Next, the configuration device 110 begins building the actual output data string instruction that will be sent to the selected venue's equipment. In step 520, the configuration device 110 reads the first (or next, depending on the situation) line from the hybrid configuration information file 600. At step 525, the system checks to see if the first two characters are "01." As an example, this would be the case with the instructions for channels two through five, seven, and eight. When the configuration device 110 comes upon these channels (previously at step 520), the last three numbers of the relevant instruction line would be added to the output data string at step 530. However, for channels one and six, the first two characters of the instructions 600 for these channels 610, 660 are not "01." Therefore, when the configuration device 110 comes upon these channels (previously at step 520) the system moves to step 535 at which the system determines whether the first two characters are "a1" or "a2." If they are not, the system signals an error at step 540. However, for channels one 610 and six 660, the first to letters are "a1" and "a2" respectively, so the configuration device 110 advances.

At step 545, the configuration device 110 determines whether the third character is an "f" For channel six 660, this is a true statement, so the system advances to step 550 at which the configuration device 110 determines whether the fourth character is a "t." Where this is true, at step 555, the unmodified value for "a1" or "a2" is added to the output string data. However, for channel six 660, the fourth letter is not a "t." The configuration device 110 therefore advances to step 560 where it is determined that the fourth letter is a "c." At step 565, the inputted value of "255" (representing a max strobe speed) is converted based on the compression information ("200000"). As the stored compression information signals to the configuration device 110 that a max strobe speed is represented by the number "200," the value "200" (unreversed) is added to the output data string.

However, at step 545, if the third character is not "f" as with channel one 610, the configuration device 110 advances to step 570 in which the third character is determined to be an "r." At step 575, the configuration device 110 determines whether the fourth character is a "t." As this is the case with channel one 610, the configuration device 110 advances to step 580 in which the inputted number (here, "200") is reversed. The reverse of "200" is "055" (because 255−200=55), and this number (uncompressed due to the "t") is added to the output data string. However, had the fourth character not been a "t" at step 575, the configuration device 110 would have advanced to step 585 at which the fourth character is determined to be a "c." In that instance, the configuration device 110 would have advanced to step 590 in which both compress and reversal would be applied to the relevant inputted number.

From each of steps 555, 565, 580, and 590, the configuration device 110 reverts to step 520 for further reading of hybrid configuration instructions 600. Based on the above steps, the output data string would be 055255255255255200000000, as follows:

- Channel one—055—a1rt results in a1 (i.e., "200") reversed and uncompressed;
- Channel two—255—added without action;
- Channel three—255—added without action;
- Channel four—255—added without action;
- Channel five—255—added without action;
- Channel six—200—a2fc200000 results in a2 (i.e., "255") unreversed but compressed on a scale of 200-max to 0-min.
- Channel seven—000—added without action; and
- Channel eight—000—added without action.

The output data string 055255255255255200000000, when transmitted to the selected venue's center zone light, will produce a ⅘ths intensity strobe at the max strobe speed of the light.

Again, it will be understood that the above syntax is merely exemplary. Other formatting and flagging could be used to contain and denote the various pieces of information discussed above, without departing from the spirit of this invention. Similarly, it will be understood that hybrid configuration instructions 600 may include a user's desired actions for more than one piece of equipment at a venue, and/or multiple sequential actions for the same piece of equipment. By compiling a list of actions and converting them to hybrid configuration instructions 600, an entire concert's worth of lighting and other effects can be provided to any known venue. The above discussed examples merely illustrate an example process for a single instruction to a single piece of equipment.

Figure 7:
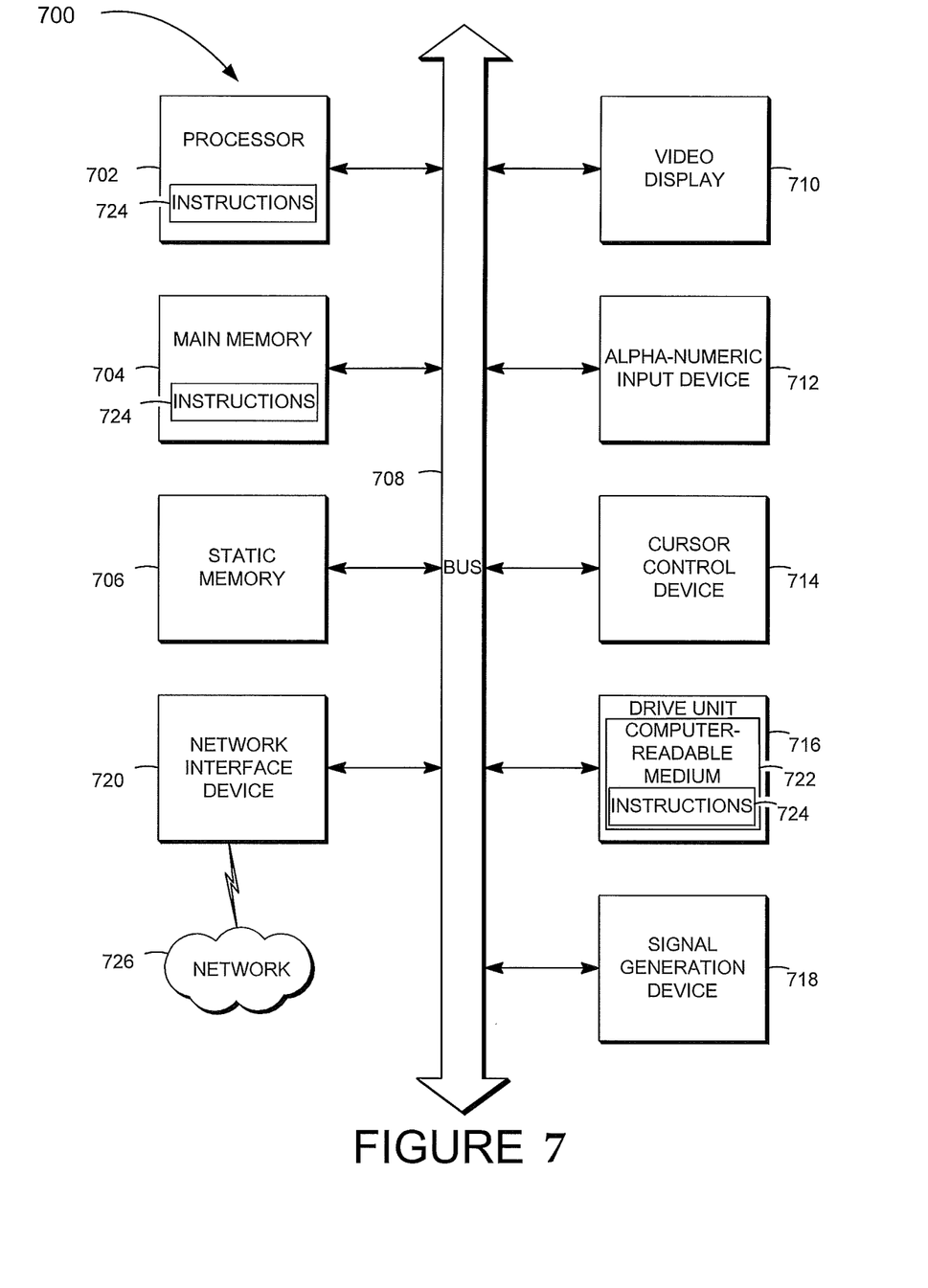
FIG. 7 is a block diagram of a machine in the example form of a computer system within which a set of instructions for causing the machine to perform any one or more of the methodologies discussed herein may be executed or stored.

FIG. 7 shows a block diagram of a machine in the example form of a computer system 700 within which a set of instructions may be executed causing the machine to perform any one or more of the methods, processes, operations, or methodologies discussed herein. The configuration device 110, the venue device 130, and/or the user device 140 may include the functionality of the one or more computer systems 700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The processor 702 may include a single discrete electronic processing element or a multiple electronic processing elements that can execute the processes, flows, and methods described herein.

The computer system 700 further includes a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a drive unit 716, a signal generation device 718 (e.g., a speaker) and a network interface device 720.

The drive unit 716 includes a computer-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702, also constituting computer-readable media.

The software 724 may further be transmitted or received over a network 726 via the network interface device 720.

While the computer-readable medium 722 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present disclosure. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

Although embodiments of the present disclosure have been described with reference to specific example embodiments, it will be evident that various modifications and changes may be made to these embodiments without departing from the broader spirit and scope of the embodiments of the present disclosure. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A system for controlling a remote electronics system, the system comprising:
   a configuration device;
   a venue device associated with a venue, said venue device in electronic communication with the configuration device via the Internet;
   a user device associated with a user, said user device in electronic communication with the configuration device via the Internet;
   a storage device storing configuration information relating to communication channels used by each piece of venue equipment included in a list of venue equipment, wherein said storage device is in electronic communication with the configuration device;
   wherein said configuration device:
      accepts, as an input from the venue device, at least one piece of venue equipment from the list of venue equipment;
      accesses said configuration information relating to the communication channels used by the at least one piece of venue equipment from the storage device;
      accepts, as an input from the user device, at least one generalized instruction for a piece of venue equipment, wherein said generalized instruction is agnostic as to which venue equipment was selected as the at least one piece of venue equipment from the list of venue equipment, wherein said generalized instruction includes a plurality of constituent components;
      accepts, from the user device via the Internet, a selection of a venue;
      when the selected venue is the venue associated with the venue device, creates at least one instruction specific to the at least one piece of venue equipment from the at least one generalized instruction by:
         rearranging each constituent component of the plurality of constituent components of the generalized instruction into a position of a corresponding communication channel used by the at least one piece of venue equipment according to the configuration information accessed from the storage device; and
         at least one of:
         adjusting a value of one or more of the plurality of constituent components of the generalized instruction based on a value range restriction imposed by the at least one piece of venue equipment, and
         adjusting a value of one or more of the plurality of constituent components of the generalized instruction based on a direction restriction imposed by the at least one piece of venue equipment; and
      transmits the at least one specific instruction to the venue device via the Internet;
   wherein the venue device uses the at least one specific instruction to control the at least one piece of venue equipment.

2. The system of claim 1, wherein each piece of venue equipment selected by the venue device is stored in an account associated with the venue device.

3. The system of claim 1, wherein each generalized instruction for a piece of equipment received from the user device is stored in an account associated with the user device.

4. The system of claim 1, wherein the storage device is local to the configuration device.

5. The system of claim 1, wherein said venue equipment is stage lights.

6. The system of claim 1, wherein the communication channels used by the at least one piece of venue equipment each correspond to an operational feature of the at least one piece of venue equipment.

7. A method for controlling a remove electronics system, the method comprising the steps of:
   accepting, at a configuration device, at least one piece of venue equipment from a list of venue equipment as an input from a venue device via the Internet;
   accessing, by the configuration device, configuration information relating to communication channels used by the at least one piece of venue equipment from a storage device in communication with the configuration device via the Internet;
   accepting, as an input from a user device via the Internet, at least one generalized instruction for a piece of venue equipment, wherein said generalized instruction is agnostic as to which venue equipment was selected as the at least one piece of venue equipment from the list of venue equipment, wherein said generalized instruction includes a plurality of constituent components;
   accepting, by the configuration device from the user device via the Internet, a selection of a venue;
   creating, by the configuration device when the selected venue is the venue associated with the venue device, at least one instruction specific to the at least one piece of venue equipment from the at least one generalized instruction by:
      rearranging each constituent component of the plurality of constituent components of the generalized instruction into a position of a corresponding communication channel used by the at least one piece of venue equipment according to the configuration information accessed from the storage device; and
      at least one of:
      adjusting a value of one or more of the plurality of constituent components of the generalized instruction based on a value range restriction imposed by the at least one piece of venue equipment, and
      adjusting a value of one or more of the plurality of constituent components of the generalized instruction based on a direction restriction imposed by the at least one piece of venue equipment;
   transmitting the at least one specific instruction from the configuration device to the venue device via the Internet; and
   controlling the at least one piece of venue equipment with the at least one specific instruction.

* * * * *